United States Patent [19]
Ishihara et al.

[11] Patent Number: 5,347,370
[45] Date of Patent: Sep. 13, 1994

[54] SHADING CORRECTION METHOD AND APPARATUS

[75] Inventors: Mitsuhiro Ishihara; Mineo Kubota; Takashi Kanda, all of Kofu; Toru Kitta; Mitsuo Tsuchiya, both of Yamanashi, all of Japan

[73] Assignee: NISCA Corporation, Yamanashi, Japan

[21] Appl. No.: 174,526

[22] Filed: Dec. 28, 1993

[30] Foreign Application Priority Data

Dec. 28, 1992 [JP] Japan ................... 4-360213

[51] Int. Cl.$^5$ ................................. G06K 9/02
[52] U.S. Cl. ............................. 358/461; 358/433
[58] Field of Search ............. 358/461, 433, 468, 163

[56] References Cited

U.S. PATENT DOCUMENTS

| | | | |
|---|---|---|---|
| 4,003,021 | 1/1977 | Sasaki et al. | 340/146.3 |
| 4,523,229 | 6/1985 | Kanmoto | 358/163 |
| 4,691,365 | 1/1987 | Nagashima | 382/54 |
| 4,829,379 | 5/1989 | Takaki | 358/163 |
| 5,260,809 | 11/1993 | Tachikawa | 358/461 |

FOREIGN PATENT DOCUMENTS

| | | |
|---|---|---|
| 57-32378 | 7/1982 | Japan . |
| 57-206171 | 12/1982 | Japan . |
| 59-223062 | 12/1984 | Japan . |
| 62-230265 | 10/1987 | Japan . |
| 63-155869 | 6/1988 | Japan . |
| 265463 | 3/1990 | Japan . |

*Primary Examiner*—Stephen Brinich
*Attorney, Agent, or Firm*—Oblon, Spivak, McClelland, Maier & Neustadt

[57] ABSTRACT

Shading correction is effected by partitioning a white standard surface into a plurality of scanning blocks having the same number of scanning lines, scanning the standard surface by block to determine block median values in a first processing stage, determining global median values from the block median values in a second processing stage, and subjecting objective image data read from a given original image to arithmetic such as proportioning calculation. With the two-stage processing, shading distortion caused due to nonuniformity in sensitivity of an image scanning system can be rationally and reliably corrected to a high degree with a simple processing circuit.

16 Claims, 9 Drawing Sheets

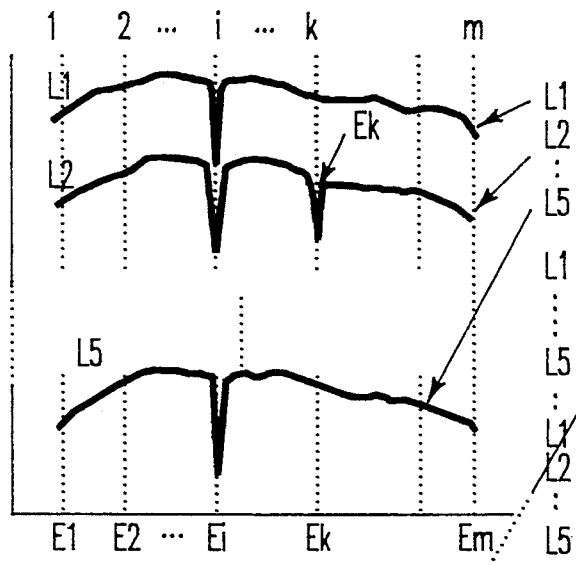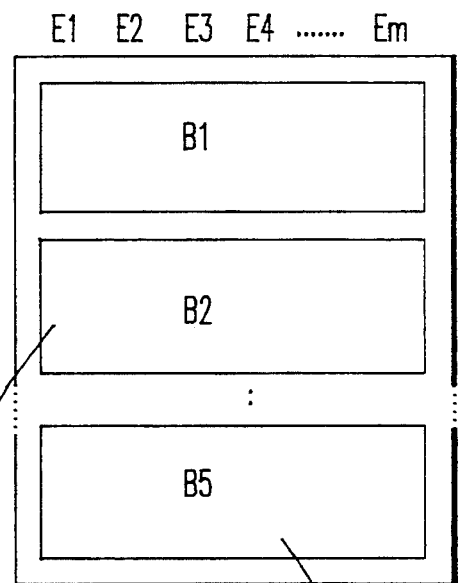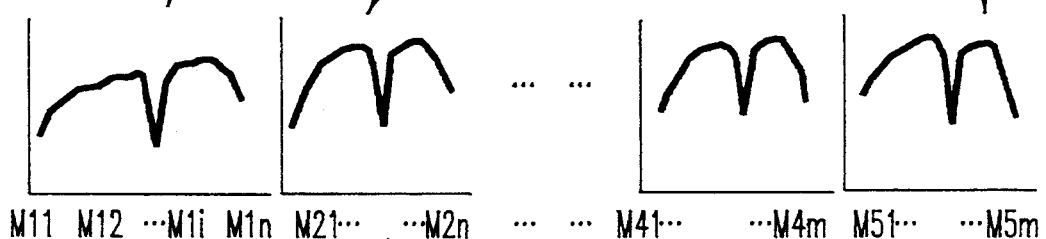

SHADING CORRECTION METHOD AND APPARATUS

BACKGROUND OF THE INVENTION

1. Field of the Invention

This invention relates to a shading correction method and device for correcting shading distortion resulting from nonuniformity in sensitivity of an image reading system including an image sensor and other possible causes. More particularly, this invention relates to a method and device capable of effectively and reliably making shading correction in the image reading system to a high degree with a simple processing circuit.

2. Description of the Prior Art

In digital image reading systems such as an image reader, digital copying machine and facsimile, a given original image such as characters and patterns to be processed is illuminated with a light source and optically read by photosensitive elements constituting an image sensor, thereby to induce electric image signals. Due to ununiform illumination of the light source and nonuniformity in sensitivity of the image sensor, nonuniformity in density appears in an image reproduced resultantly, which disagrees with the original image. This phenomenon is generally called "shading distortion" and inevitably takes place in the image reading system of this type.

For instance, the light source for illuminating the original image is irregularly degraded gradually in illumination intensity during the course of prolonged service. Also, the sensitivity of the image sensor is irregularly reduced during prolonged use. In general, the shading distortion due to such causes appears in the form of dark stripes extending in the sub-scanning direction in the reproduced image finally obtained.

In order to avoid appearance of the shading in the reproduced image, it is required to effect previous shading correction by reading a white standard surface prior to read-scanning operation for an objective image designated to be processed.

To be more specific, the standard surface s is partitioned into m in the main-scanning (row) direction and into n in the sub-scanning (line) direction to determine an mxn matrix in soft and prescribe pixels (image elements) El . . . Ei . . . Em in each line, as illustrated in FIG. 1. The pixels are sequentially read out by line with the image sensor 1 having m-photosensitive elements arranged in an array. The standard surface s is scanned by relatively moving the image sensor 1 in the sub-scanning direction to read out image data in n-scanning line L1 . . . Lj . . . Ln by line.

Since the standard surface s is white, all image values outputted from the image sensor which represent the brightness of the pixels should be maximum in theory, but in reality the output signals So (o=1 . . . j . . . m) from the photosensitive elements are not constant as schematically shown by the graph in FIG. 1 due to the causes noted above. In the drawing, remarkable electric drops of the output signals Si are found in common in i-row, which are considered as the shading distortion. When an electric drop occurs locally like the pixel Ek in the row k of the line Lj in the drawing, it may be possibly caused due to a dark spot on the white standard surface or electrical noise such as electrical disturbance. In any case, these undesirable matters must be eliminated to reproduce the image with accuracy.

There have been conventionally proposed various methods for effecting shading correction, as follows:
U.S. Pat. No. 4,003,023 [H. SASAKI ET AL.]
U.S. Pat. No. 4,523,229 [Y. KANMOTO]
U.S. Pat. No. 4,691,365 [N. NAGASHIMA]
U.S. Pat. No. 4,829,379 [T. TAKAKI]

All these prior art are related by and large to a shading correction technique in which low level signals of image data produced by previously reading out a white standard surface by line are substituted with a reference "mean value" obtained by averaging the image data read out in one scanning line. The low level signal St in the sensitive characteristic pattern FP is raised to the mean value Vm as schematically shown by a dotted line in FIG. 1 by way of example.

The conventional shading correction method in which the low level signals are substituted with the mean value can be carried out by use of an easy arithmetic algorithm and a simple processing circuit, but accurate shading correction cannot be expected. This is because the mean value obtained by averaging the entire sensitivity of photosensitive elements of an image sensor is lowered by aging as a matter of course, only to incur increase of shading distortion. Furthermore, the conventional shading correction method is affected quite sensitively by the conditions of the white standard surface used in a preliminary read-scanning process. For instance, undesirable factors on the white standard surface such as dark spots or image noises are regarded as an objective to be corrected, consequently to frustrate the shading correction.

Another prior art, U.S. Pat. No. 5,260,809 [K. TACHIKAWA; Nisca's U.S. Patent] (corresponding to Japanese Patent Application Public Disclosure No. HEI 2-65463) discloses a shading compensating method in which shading correction in an image reading system is made by the steps of determining a comparative value by previously scanning white and black standard surfaces, and multiplying shading correction value represented as the ratio of actual image values obtained by scanning a given objective image to the comparative values by coefficient representing gradation of a resultant image to be reproduced.

Thus, the shading compensating method performs a high level arithmetic operation of multiplying the gradation of the reproduced image by the shading correction values given by the ratio of the actual image values to the comparative values of the white and black standard values, but it calls for a relatively complicated processing circuit for effecting the arithmetic algorithm.

A method of correcting a local noise on a white standard surface used in a preliminary scanning process is proposed in Japanese Patent Appln. Public Disclosure No. SHO 63-155869. In this prior art method, the local noise appearing at a specific pixel in a specific scanning row on the white standard surface is corrected by substituting an image value of the specific pixel with a median value selected from image values of all pixels in the specific scanning row. To effect the correction of the local noises on the standard surface with a high degree of accuracy by the prior art method, all the image signals detected from all the pixels prescribed on the standard surface must be stored in memories such as latch memories until the scanning of all of the pixels on the standard surface is finished. Although such a method essentially calls for enormous memories, the proposed method attempts to reduce the number of memories by thinning down image data read out from an objective original image to substantially scan the original image roughly, and furthermore, the median value extracted by the proposed method leaves change in the sub-scanning direction out of consideration, resulting in decrease in accuracy of image reading.

Assuming that the local noise correction method noted above is simply applied to shading correction, it requires too many memories to be practicable.

OBJECT OF THE INVENTION

Accordingly, it is an object of the present invention is to provide a shading correction method and device capable of effectively and reliably making corrections for shading distortion in an image reading system to a high degree with a simple processing circuit.

Another object of the invention is to provide a high level shading correction method and device capable of rationally extracting image data from the wide area of a standard surface with a high accuracy to enable a given objective image to be processed with excellent reproducibility.

SUMMARY OF THE INVENTION

To attain the object described above according to this invention, there is provided a shading correction method comprising the steps of partitioning a standard surface having a plurality of scanning lines into a plurality of scanning blocks, scanning the standard surface to obtain image signals by block, determining sets of block median values of the scanning blocks from the image signals of pixels at the same number in the scanning lines, determining one set of global median values from the block median values of the scanning blocks, and subjecting objective image data read from an original image to shading correction based on the global median values.

Further, this invention provides a shading correction device comprising image scanning means for scanning a standard surface partitioned into a plurality of scanning blocks to output image signals by block, image memory means for storing image signals from the image scanning means, a first processing circuit for determining sets of block median values of the respective scanning blocks from the image signals from the image memory means, median memory means for storing the block median values, a second processing circuit for determining one set of global median values from the block median values, and a shading correction circuit for subjecting objective image data read from an objective original image to shading correction based on the global median values.

In the first processing stage, a plurality of sets of the block median values representing the local features of the standard surface partitioned into the scanning blocks are determined, and in the second processing stage, one set of global median values are determined. Thus, by determining two different sorts of median values in two processing stages, the number of memories can be reduced remarkably, and the arithmetic for practicing the shading correction can be simplified rationally.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

Other objects and features of the present invention will be hereinafter explained in detail with reference to the accompanying drawings, wherein:

FIG. 2 is a conceptual view for graphically explaining a shading correction method of the present invention;

DESCRIPTION OF THE PREFERRED EMBODIMENTS

The shading correction method according to the present invention will become more fully understood from the detailed description given hereinbelow and the accompanying drawings which are conceptually given by way of illustration only, and thus are not limitative of the present invention.

In the shading correction method of this invention, a standard surface s on which an mxn matrix having m-rows and n-lines is prescribed imaginarily or in software is further partitioned into a plurality of scanning blocks B1 ... Bf each having g-scanning lines (L1 ... Lg). The numbers f and g are not specifically limited, but are desirably the same odd number. For brevity's sake, the numbers f and g are tentatively determined to five (f=5 and g=5) by way of example, namely, the standard surface s in this embodiment has an area to be scanned of total 25 scanning lines [(5 scanning lines L1 ... L5)×(5 scanning blocks B1 ... B5)].

The two processing stages essential to this invention for determining two different sorts of median values (sets of block median values and one set of global median values) are schematically shown in FIG. 2. That is to say, a plurality of sets of block median values Mba ("b" represents the block number, and "a" represents the pixel number [1 ... m]) are determined from image signals So obtained as the result of scanning the scanning lines on the standard surface s.

The shading distortion appears in the global median values Ga in the form of a low level as conceptually shown as the pixel Gi in FIG. 2.

Then, the shading distortion is corrected by performing arithmetic such as proportioning calculation on objective image data read out from an original image to be processed on the basis of the global median values Ga.

Figure 1A:
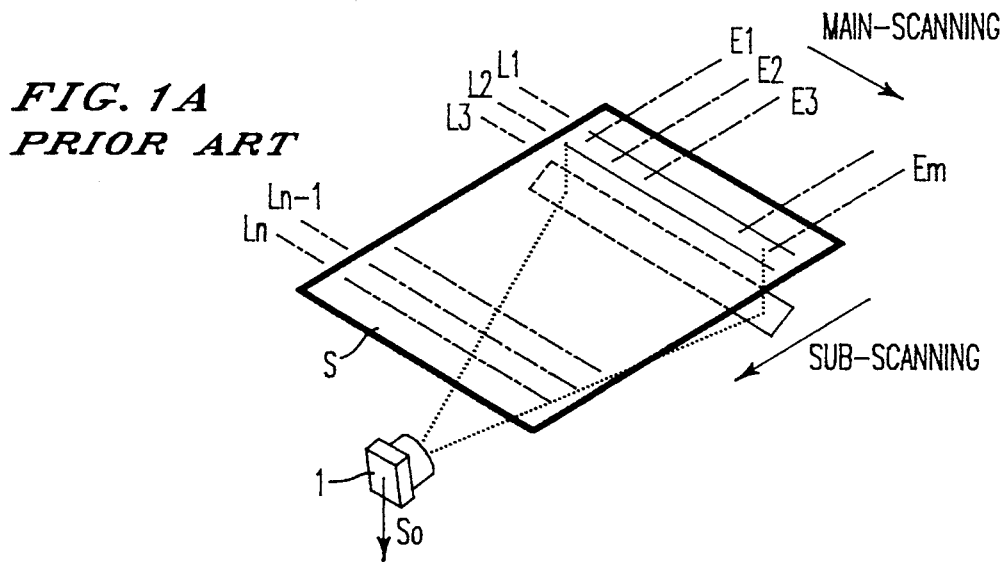
FIG. 1 is a conceptual view schematically showing a conventional shading correction method.
Figure 1B:
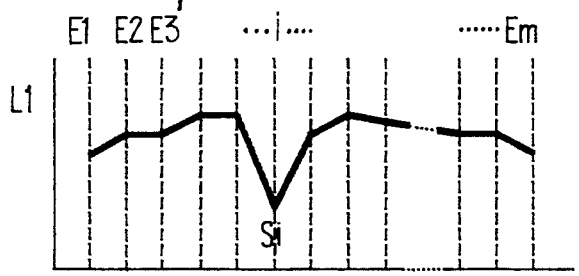
Figure 1C:
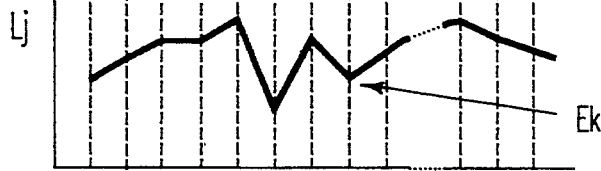
Figure 1D:
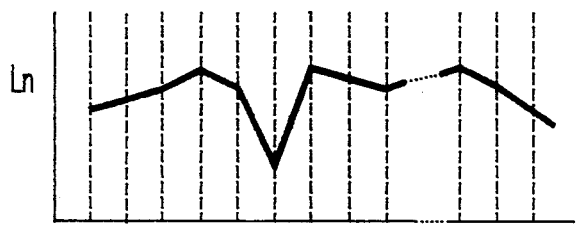
Figure 1E:
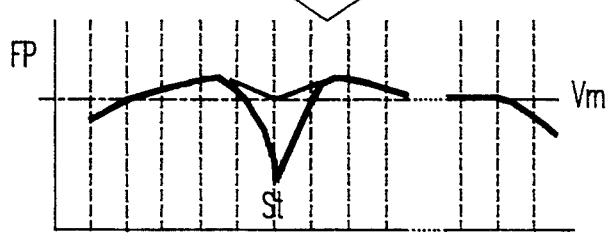
Figure 3A:
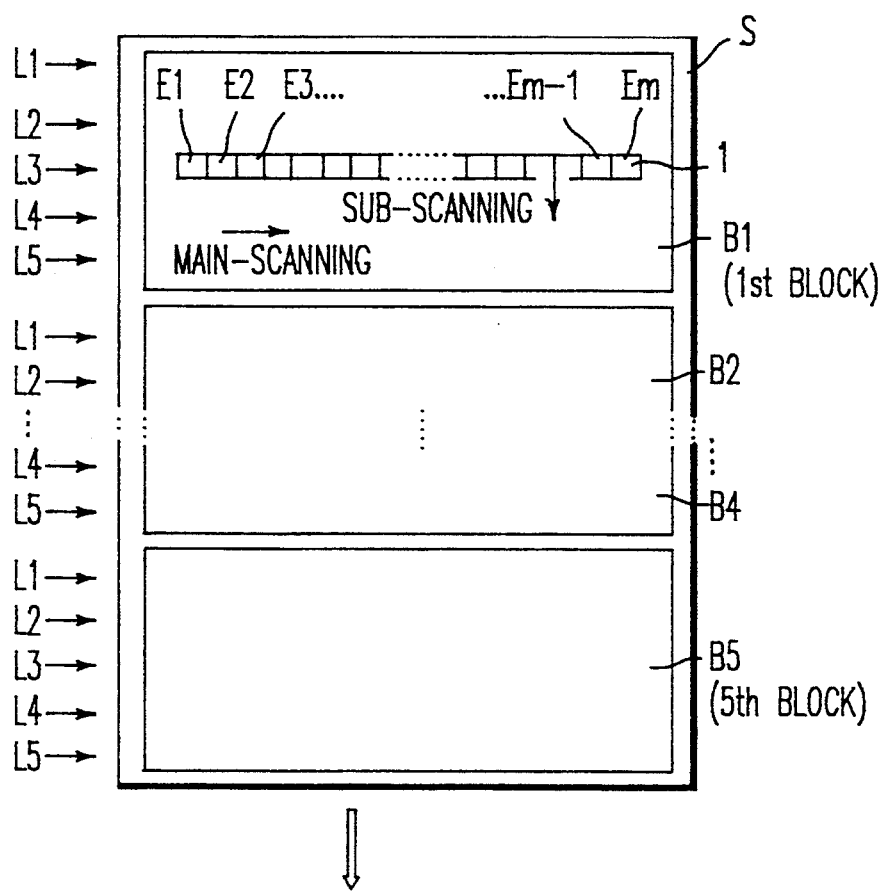
FIG. 3 is a conceptual view for numerically explaining the shading correction method of this invention.
Figure 3B:
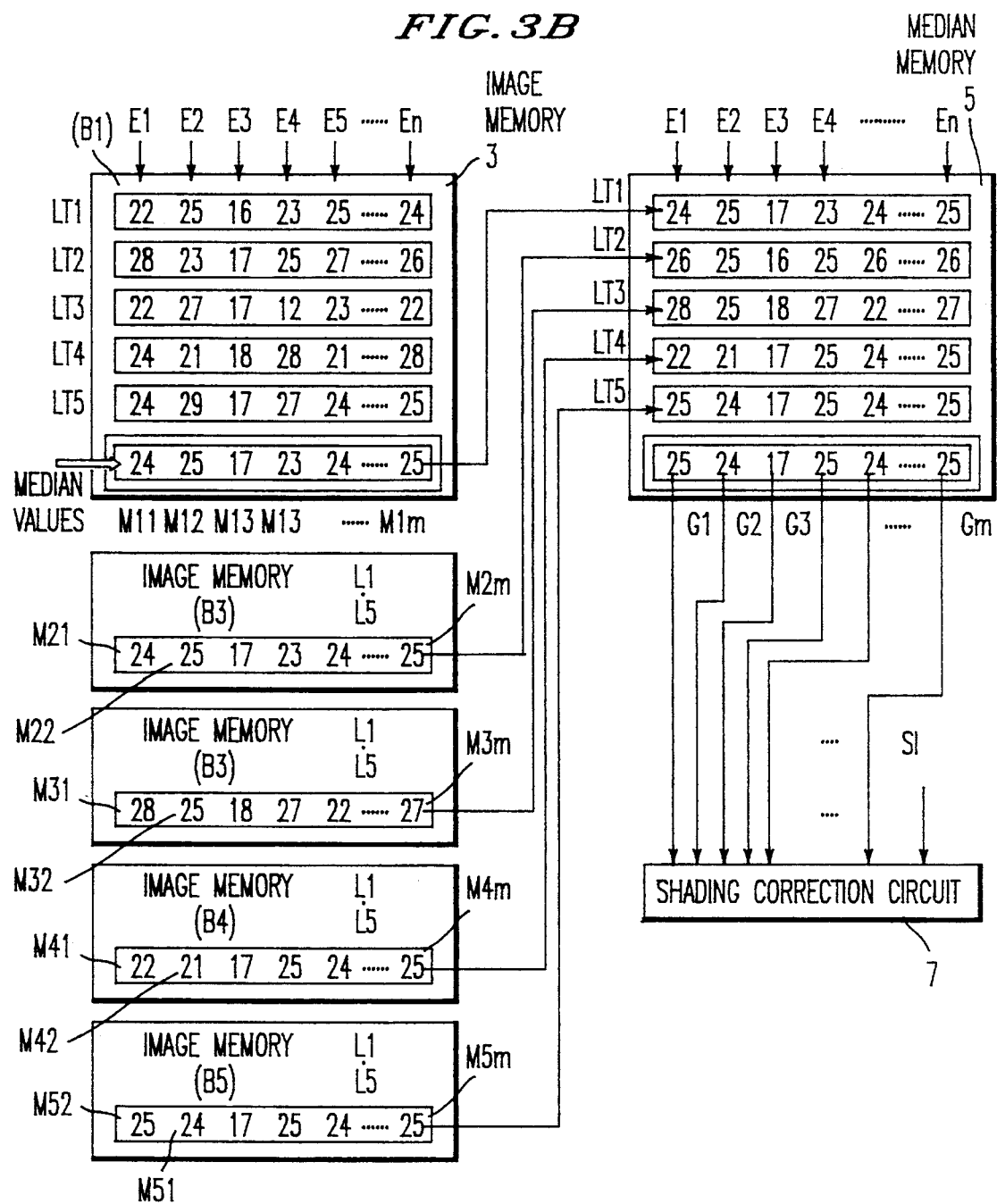
Figure 4:
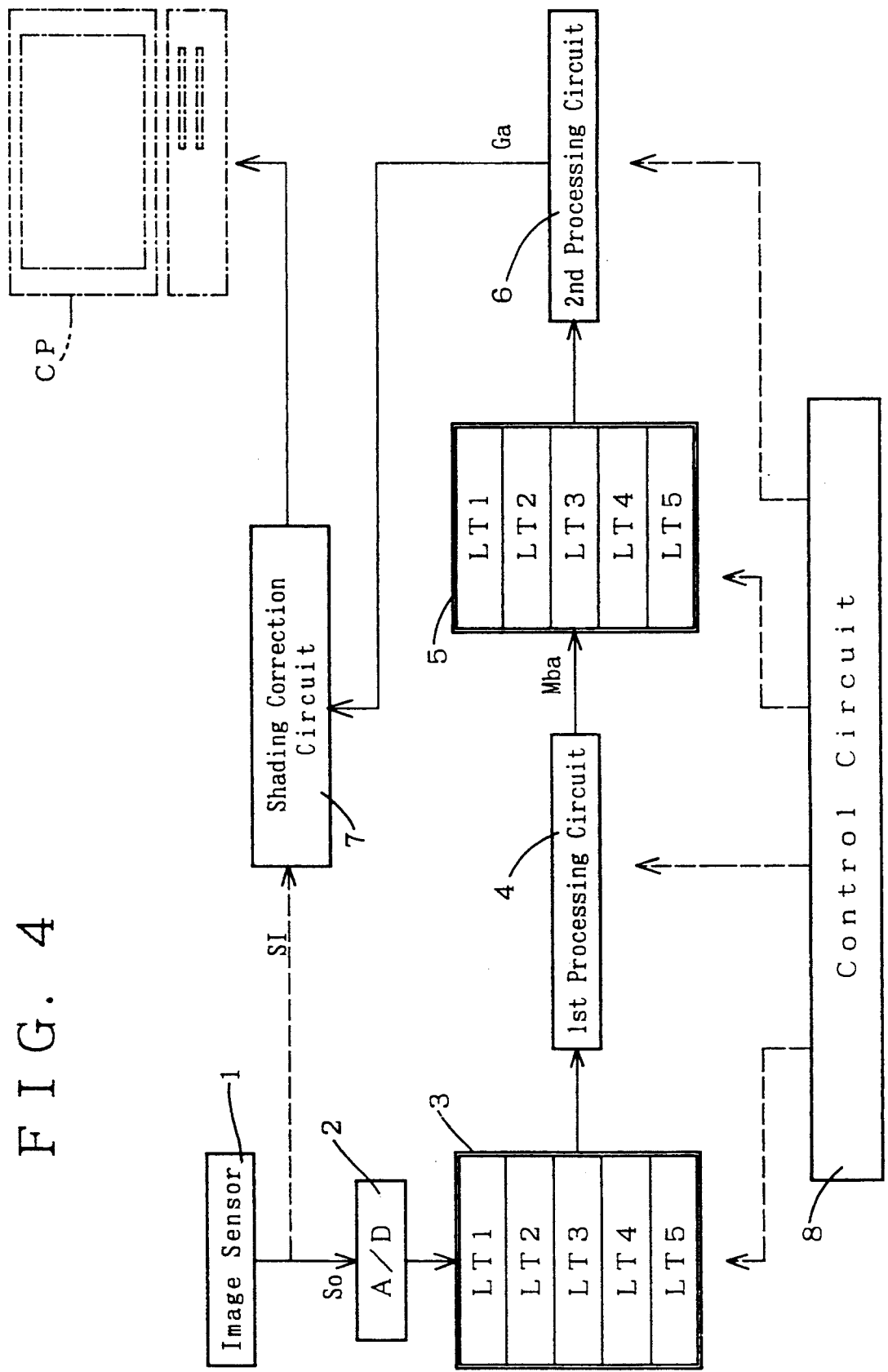
FIG. 4 is a block diagram of a shading correction device according to this invention.
Figure 5:
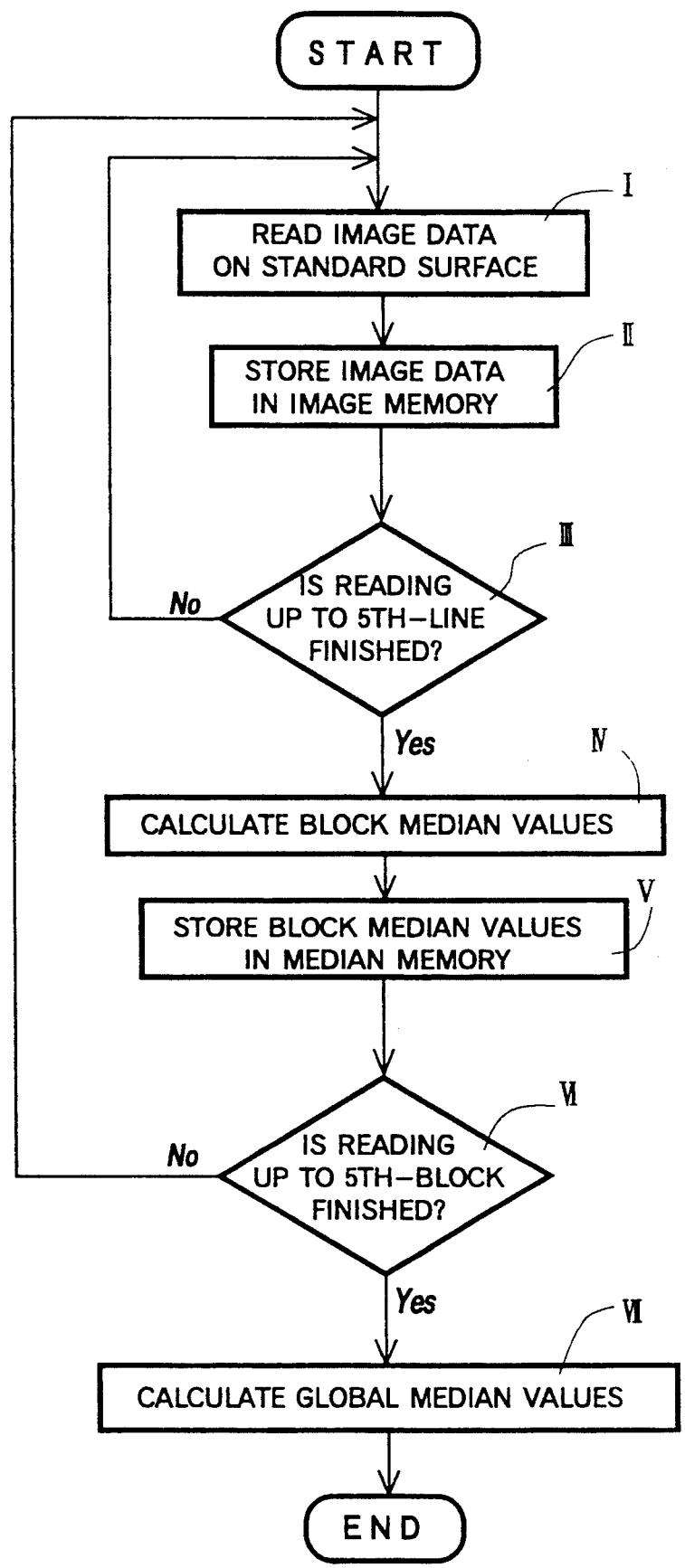
FIG. 5 is a flowchart showing the shading correction processing of this invention.

The following will expatiate on the shading correction processing of the invention on reference to FIG. 3 through FIG. 5.

First of all, the standard surface s is scanned to sequentially read pure white pixels on the standard surface with an image sensor 1 having m-photosensitive elements arrayed in the main-scanning direction (Step I). The white pixels on the standard surface are optically read to output analog image signals So from the respective photosensitive elements of the image sensor 1.

The analog image signals from the image sensor 1 are converted to corresponding digital image signals SI by an analog-to-digital converter (A/D) 2. The digital image signals SI read out from the respective scanning lines L1 . . . L5 are stored in designated latch memories LT1 . . . LT5 of an image memory 3 (Step II). The state in which the image data are stored in the image memory 3 is conceptually illustrated in the first scanning block B1 in FIG. 3.

When the scanning of all the scanning lines L1 . . . L5 is completed (Step III), the block median values Mba (e.g. Mll . . . Mlm in the first block B1) are calculated from the image data of the pixels which have the same pixel numbers in the respective scanning lines and, namely, positioned in the same row in the sub-scanning direction by the first processing circuit 4 (Step IV).

The block median values Mbl . . . Mbm thus obtained are stored in sequence in the median memory 5 (Step V).

The aforesaid steps I . . . V are repeated until the scanning of the fifth block B5 is completed (Step VI).

When the scanning of the fifth block B5 is completed, one set of global median values Ga ("a" represents the pixel number [1 . . . m]) are calculated from the five sets of the block median values Mba of the scanning blocks B1 . . . B5 (Step VII). The state in which the block median values Mba are stored in the median memory is conceptually shown in the median memory 5 of FIG. 3.

When an objective original image to be processed substantially is scanned, the global median values Ga thus obtained are given to a shading correction circuit 7, so that the image data outputted sequentially from the image sensor 1 as the result of scanning the objective original image are subjected to shading correction on the basis of the global median values Ga.

The operation of the image sensor 1, the read/write operations, addressing operations of the latch memories LT1 . . . LT5 of the respective image memory 3 and median memory 5, and the operations of the first and second processing circuits 4 and 6 are generally controlled by a control circuit 8.

Figure 6:
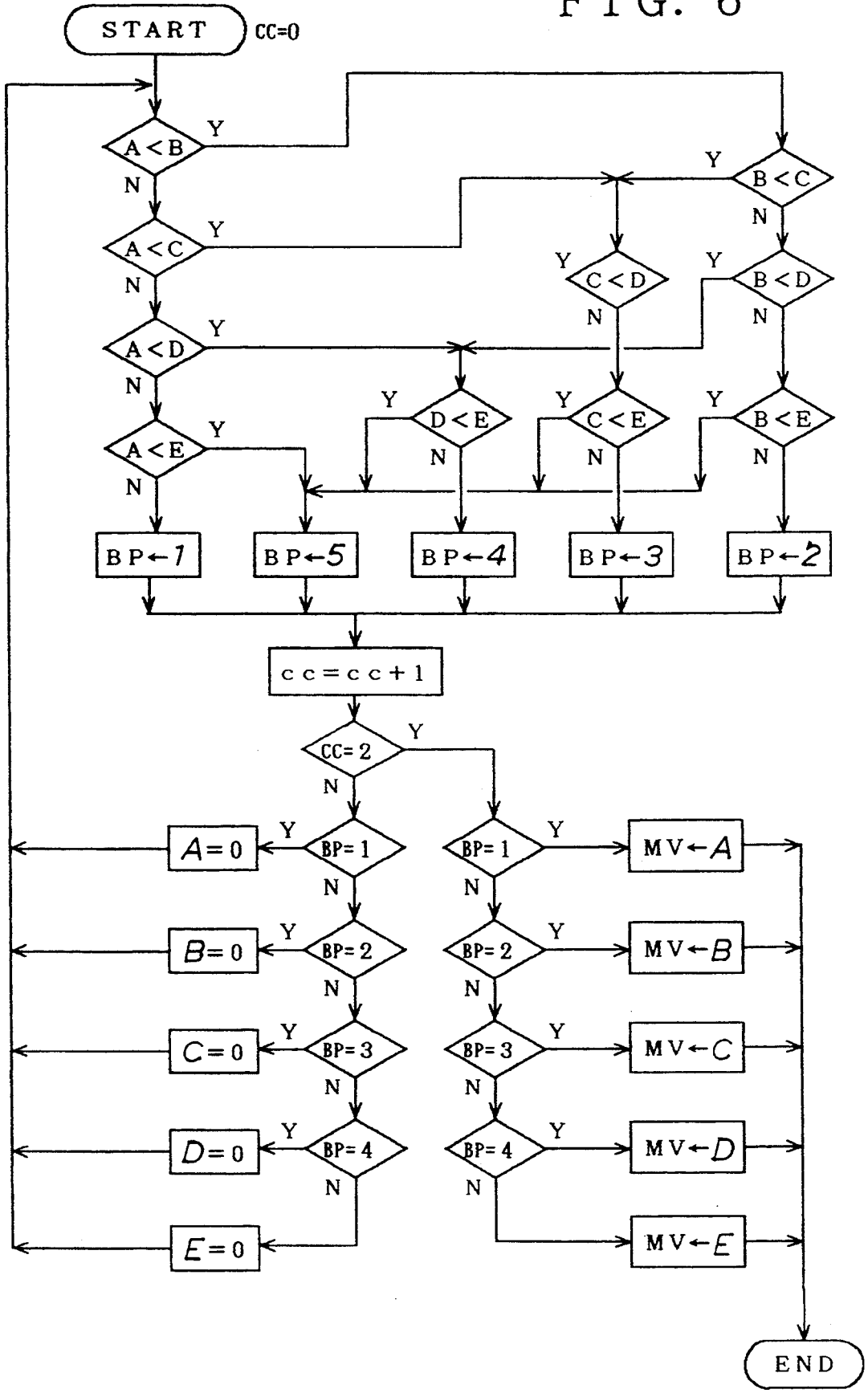
FIG. 6 is a flowchart showing one example of determining block or global median values in the shading correction processing of this invention.

One example of various methods capable of calculating the block median values Mba and the global median values Ga will be explained with reference to FIG. 6.

The block median values and global median values are calculated in the same manner. Here, to simplify the explanation of the principle of calculating the block and global median values, the line number in each block and the total block number respectively assume 5, i.e. five Values A . . . E which are predetermined to the following numerical relation (1) by way of example. That is, the Values A . . . E in the respective scanning blocks B1 . . . B5 correspond to the pixels positioned in the same row and having the same pixel number in the respective scanning lines, and those in the global median memory correspond to the median values Mab (a=1 . . . 5). However, the line number and the total block number are by no means limitative.

Assume that Values A . . . E are:

$$A:B:C:D:E = 2:3:1:0:4 \tag{1}$$

The relation is established as follows:

$$D < C < A < B < E \tag{2}$$

In the first arithmetic process when a count is "0" (cc=0), Big-pointer "5" (BP=5) is elected so that Value E becomes "0" (E=0), resulting in:

$$A:B:C:D:E = 2:3:1:0:0 \tag{3}$$

Namely, $D = E < C < A < B$ \hfill (4)

Upon adding one count (cc=1), the arithmetic process returns to "START", and then, Big-pointer "2" (BP=2) is elected to enter a median value determination processing. Because of BP=1, the median value MV is determined to the original value "2" of Value A. Accordingly, the resultant median value becomes "2".

Thus, by performing the above-noted comparison operation on the respective image signals and block median values, the value of a specific pixel having the designated number is elected as the median value.

As is understood from the foregoing, what should be noted is the fact that the median value in this invention is not a "mean value", but it can represent the optimum condition essentially inherent in the image reading system composed of the light source and image sensor.

The local noise components caused due to dark spots on the standard surface, electric disturbance and so forth as illustrated in the form of the low level point Ek in the image signal pattern L2 in FIG. 2 by example can be fully eliminated only by the first arithmetic process of calculating the block median values.

Figure 7:
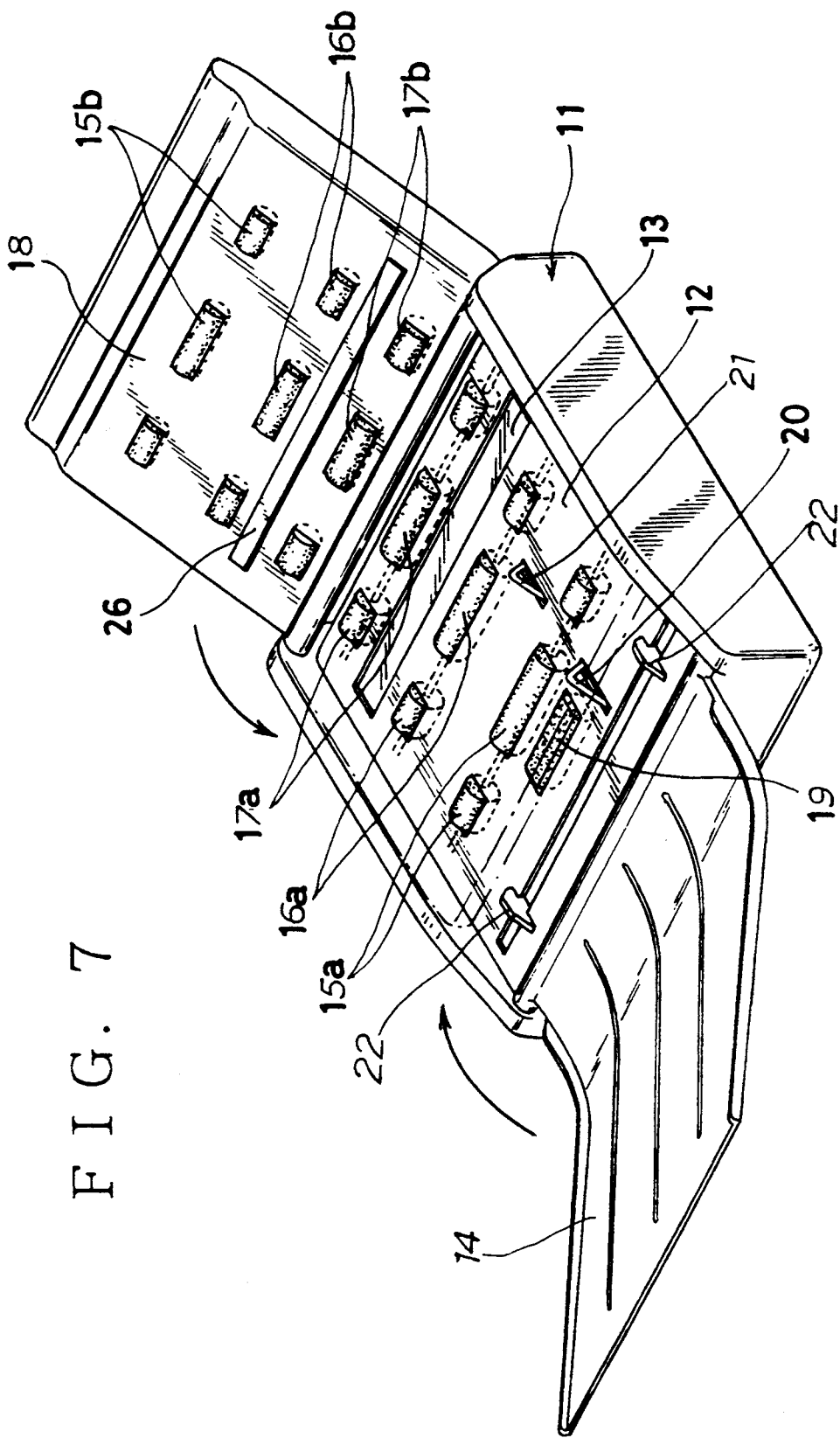
FIG. 7 is a perspective view showing one example of an image scanner used to this invention.
Figure 8:
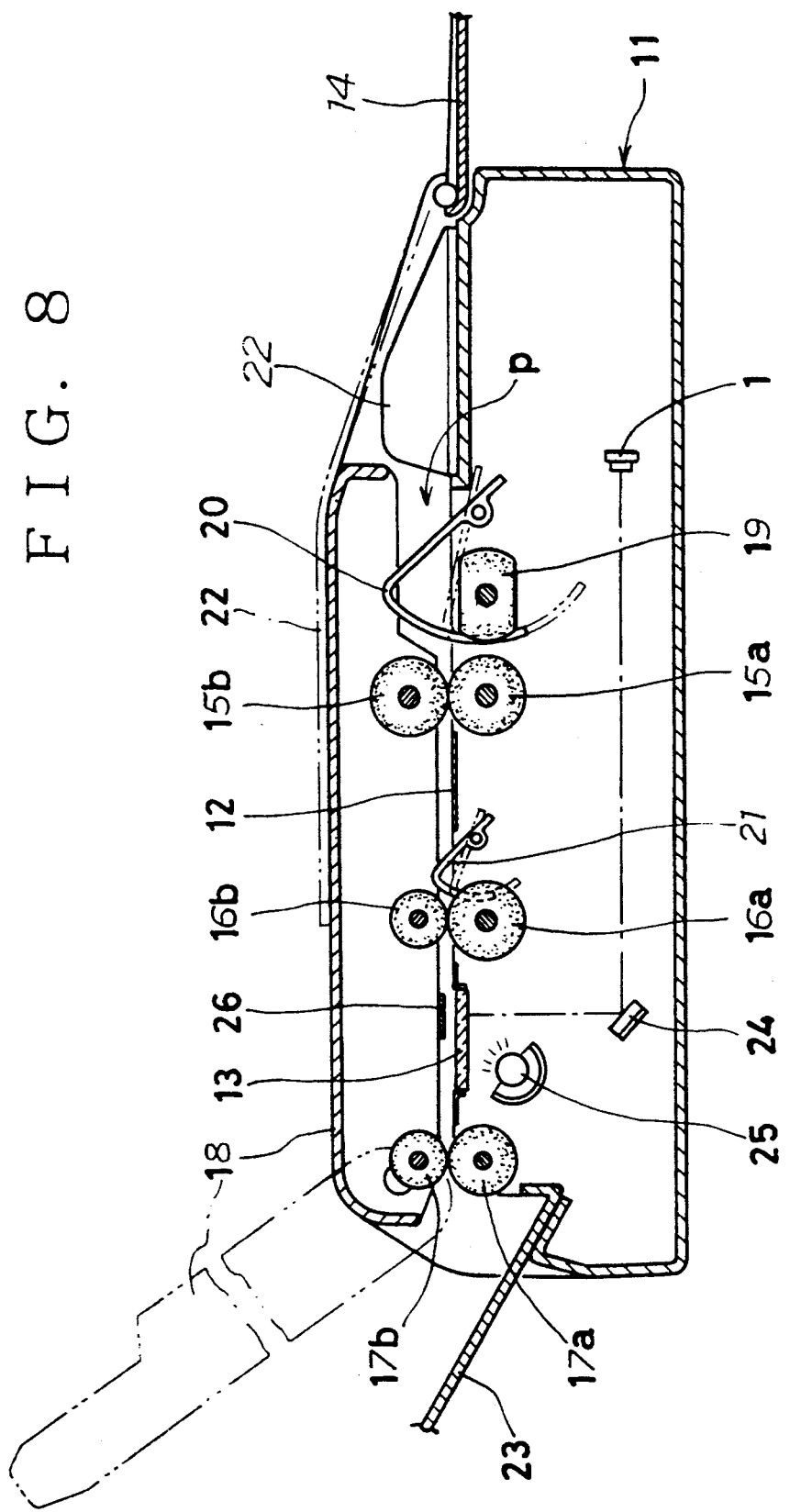
FIG. 8 is a sectional side view showing the image scanner of FIG. 7.

FIG. 7 and FIG. 8 show an image scanner which can be applied as the image reading system to this invention. The outline of the image scanner will be given below.

This image scanner has a function of automatically feeding a given document sheet (original image), and comprises a scanner body 11 having a document support face 12 with a document reading aperture 13, a document feeding tray 14, paired document separation rollers 15a and 15b rotatable in opposite directions for permitting the document sheets to pass therebetween one by one, and paired document feeding rollers 16a–16b and 17a–17b. Ones of the paired rollers, 15b, 16b and 17b are held in a cover member 18 hinged on the scanner body 11. The rollers 16a and 16b serves as register rollers for making the direction of the document sheet proper.

The document sheets stacked on the document feeding tray 14 are separated by one by the document separation rollers 15a and 15b and forwarded through a document passage p defined between the document support face 12 and the cover member 18 by the document feeding rollers 16a–16b and 17a–17b. The document sheet is scanned, while advancing through the document passage p, to read out an objective image thereon through the document reading aperture 13 formed in the document support face 12 by an image reading system contained within the scanner body 11. The image reading system generally comprises the image sensor 1, an image light reflector 24, and a light source 25.

In the drawings, reference numeral 19 denotes a document pickup roller having a noncircular section, 20 denotes a document sensor lever, 21 denotes a register sensor lever, 22 denotes a document guide movable widthwise, 23 denotes a document discharge tray, and 26 denotes a white plate attached to the cover member 18 opposite to the document reading aperture 13.

The preliminary scanning operation for scanning the standard surface to determine the global median values as specified above is carried out by forwarding the given document over the document reading aperture 13 through the document passage defined by the document feeding rollers. The image signals SI resultantly obtained are subjected to shading correction in the manner as described above.

As is apparent from the foregoing description, since the present invention performs two-stage median value determining operations on the image data read from the standard surface, the number of memories required for storing the image data and median values can be remarkably reduced to simplify the processing circuit and image reading system. Thus, according to the present inventions appropriate shading correction can be rationally effected to a high degree with the simple processing circuit.

As can be readily appreciated, it is possible to deviate from the above embodiments of the present invention and, as will be readily understood by those skilled in this art, the invention is capable of many modifications and improvements within the scope and spirit thereof. Accordingly, it will be understood that the invention is not to be limited by these specific embodiments, but only by the scope and spirit of the appended claims.

What is claimed is:

1. A shading correction method comprising:
    partitioning a standard surface having a plurality of scanning lines into a plurality of scanning blocks;
    scanning said standard surface to obtain image signals by block;
    determining sets of block median values of the scanning blocks from said image signals of pixels of the same number in said scanning lines;
    determining one set of global median values from said block median values of said scanning blocks; and
    subjecting objective image data read from an original image to shading correction based on said global median values.

2. A shading correction method according to claim 1, wherein said scanning blocks are each composed of the scanning lines of an equal odd number.

3. A shading correction method according to claim 1, wherein said standard surface is composed of the scanning blocks of an equal odd number.

4. A shading correction method according to claim 1, wherein said scanning blocks are each composed of the scanning lines of an equal odd number, and said standard surface is composed of the scanning blocks of an equal odd number.

5. A shading correction method according to claim 1, wherein said block median value is an image value of a specific pixel determined by comparing image signals of the pixels having the same number in the respective scanning lines with one another.

6. A shading correction method according to claim 1, wherein said global median value is determined by comparing said block median values of the pixels having the same number in the respective scanning blocks with one another.

7. A shading correction method according to claim 1, wherein said block median value is an image value of a specific pixel determined by comparing image signals of the pixels having the same number in the respective scanning lines with one another, and said global median value is determined by comparing said block median values of the pixels having the same number in the respective scanning blocks with one another.

8. A shading correction method according to claim 1, wherein said shading correction is performed by subjecting said global median values and objective image data obtained from said original image to proportioning calculation.

9. A shading correction method in which a standard surface having an imaginary matrix of pixels arrayed in a main-scanning direction to form scanning lines of pixels and arrayed in a sub-scanning direction to form scanning rows of pixels is preliminarily scanned prior to image reading of an objective original image to eliminate shading distortion appearing in an image scanning system, comprising:
    (a) partitioning said standard surface into a plurality of scanning blocks composed of equal scanning lines;
    (b) scanning the pixels on said standard surface in the main-scanning direction to obtain image signals by line;
    (c) repeating the scanning of the pixels in each scanning lines in the main-scanning direction until all the scanning lines in each scanning block is completely scanned;
    (d) effecting a first arithmetic processing to determine sets of block median values of the scanning blocks from said image signals of pixels in the scanning lines of the respective scanning blocks;
    (e) effecting a second arithmetic processing to determine one set of global median values from said block median values of said scanning blocks; and
    (f) subjecting objective image data obtained by reading said original image to shading correction based on said global median values.

10. A shading correction method according to claim 9, wherein said shading correction is performed by subjecting said global median values and objective image data obtained from said original image to proportioning calculation.

11. A shading correction device comprising:
    an image scanning system for scanning a standard surface having a plurality of scanning lines and partitioned into a plurality of scanning blocks to read out image data from the standard surface by line;
    image memory means for storing said image data read out from said image scanning system by line, while moving said image scanning system relative to the standard surface;
    a first processing circuit for determining sets of block median values from said image data from said image memory means;
    block memory means for storing said block median values;
    a second processing circuit for determining a set of global median values from said block median values; and
    a shading correction circuit for making shading correction based on said global median values.

12. A shading correction device according to claim 11, wherein said image memory means comprises a plurality of latch memories.

13. A shading correction device according to claim 11, wherein said block memory means comprises a plurality of latch memories.

14. A shading correction device according to claim 11, wherein said image memory means and block memory means each comprise a plurality of latch memories.

15. A shading correction device according to claim 11, wherein said image memory means and block memory means each comprise latch memories of an equal odd number.

16. A shading correction device according to claim 11, wherein said shading correction circuit performs to subject said global median values and objective image data obtained from said original image to proportioning calculation.

* * * * *